United States Patent [19]

Barth

[11] Patent Number: 5,141,247
[45] Date of Patent: Aug. 25, 1992

[54] AIR BAG INFLATOR ASSEMBLY

[75] Inventor: Thomas H. Barth, Tempe, Ariz.

[73] Assignee: TRW Inc., Lyndhurst, Ohio

[21] Appl. No.: 629,378

[22] Filed: Dec. 18, 1990

[51] Int. Cl.⁵ ............................................. B60R 21/16
[52] U.S. Cl. ..................................... 280/728; 29/513
[58] Field of Search ............... 280/728, 730, 731, 732, 280/736, 740, 741, 743, 750; 141/313, 314; 403/195, 194, 199; 411/502, 503, 521; 29/513

[56] References Cited

U.S. PATENT DOCUMENTS

| | | | |
|---|---|---|---|
| 2,554,078 | 5/1951 | Werner | 29/513 |
| 3,302,221 | 2/1967 | Zysman | 29/513 |
| 3,819,205 | 6/1974 | Dunford et al. | 280/731 |
| 3,942,391 | 3/1976 | Barth et al. | 280/751 |
| 4,325,568 | 4/1982 | Clark et al. | 280/731 |
| 4,830,401 | 5/1989 | Honda | 280/775 |
| 4,877,264 | 10/1989 | Cuevas | 280/731 |
| 4,988,119 | 1/1991 | Hartmeyer | 280/743 |

FOREIGN PATENT DOCUMENTS

| | | | |
|---|---|---|---|
| 815530 | 10/1951 | Fed. Rep. of Germany | 411/502 |
| 1079612 | 8/1967 | United Kingdom | 280/730 |

Primary Examiner—Charles A. Marmor
Assistant Examiner—Karin Tyson
Attorney, Agent, or Firm—Tarolli, Sundheim & Covell

[57] ABSTRACT

A vehicle occupant safety apparatus including an inflatable air bag, an inflator for inflating the air bag, and a support plate for supporting the air bag and the inflator on a vehicle steering wheel. The safety apparatus further includes a retainer ring for clamping together the air bag, the inflator, and the support plate. The retainer ring has tabs which are bendable into positions for exerting clamping forces on the air bag, the inflator, and the support plate.

9 Claims, 5 Drawing Sheets 5,141,247

1

AIR BAG INFLATOR ASSEMBLY

FIELD OF THE INVENTION

The present invention relates to an assembly technique for a vehicle occupant safety apparatus, such as an air bag module, and particularly relates to attachment of components of an air bag module, such as an air bag inflator and an air bag, to a support plate.

BACKGROUND OF THE INVENTION

A variety of techniques have been used in the past to assemble together components of an air bag module. One common technique is to use fasteners which extend through aligned openings in the various components.

U.S. Pat. No. 3,819,205 discloses an air bag module in which various components are assembled together using threaded fasteners. The air bag module disclosed in the '205 patent comprises an air bag, a gas generator, a diffuser for directing gas from the gas generator into the air bag, and a support plate which is connectable to a vehicle steering wheel. The gas generator and the diffuser have flanges that are held against opposite sides of the support plate by the threaded fasteners. The air bag is held in place between the diffuser and the support plate by the threaded fasteners. The air bag, the gas generator, and the diffuser are thus fastened to the support plate so that they can be mounted as a unit on the steering wheel.

SUMMARY OF THE INVENTION

In accordance with the present invention, a vehicle occupant safety apparatus comprises an inflatable air bag, an inflator for inflating the air bag, and a support plate for supporting the inflator and the air bag in a vehicle. The safety apparatus further comprises means for clamping the air bag and the inflator to the support plate. The clamping means comprises clamping elements which are bent into positions for clamping the air bag, the inflator, and the support plate together.

In a preferred embodiment of the present invention, the clamping means comprises a retainer member having a ring shaped base portion and a circular retainer flange extending radially from the base portion. The retainer member further comprises two groups of tabs extending from the base portion. The first group of tabs extends radially inwardly of the retainer flange. Those tabs support one side of a flange on the inflator. Individual tabs of the second group extend radially inward to clamp the inflator flange against the first group of tabs. Other individual tabs of the second group extend radially outward to clamp the air bag between the support plate and the retainer flange. The retainer member thus secures the air bag, the inflator, and the support plate together.

BRIEF DESCRIPTION OF THE DRAWINGS

The foregoing and other features of the present invention will become apparent to those skilled in the art upon reading the following description of a preferred embodiment of the invention in view of the accompanying drawings, wherein.

2

Figure 1:
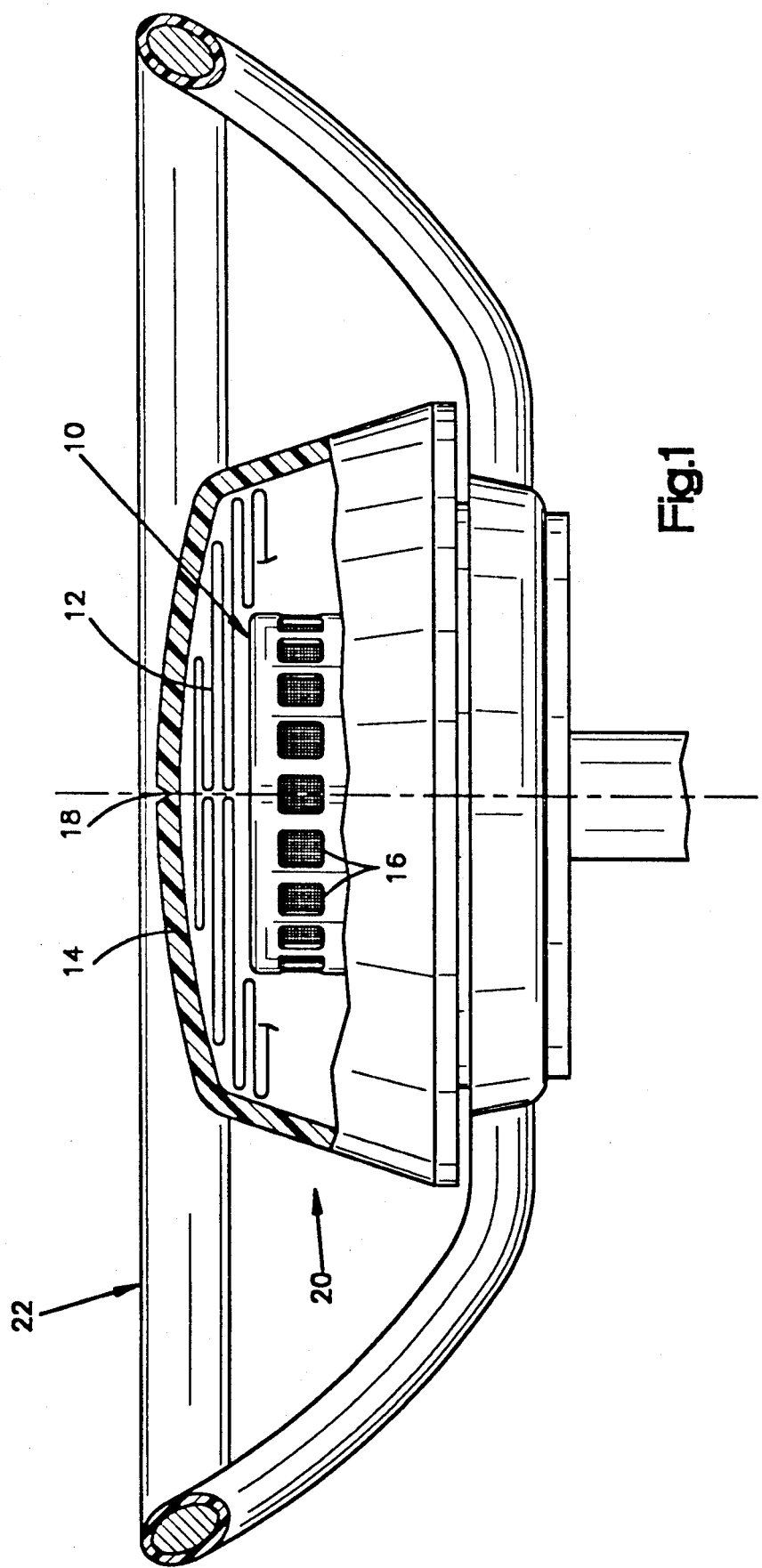
FIG. 1 is a side view, partially in section, of a vehicle steering wheel and a vehicle occupant safety apparatus in accordance with the present invention.
Figure 2:
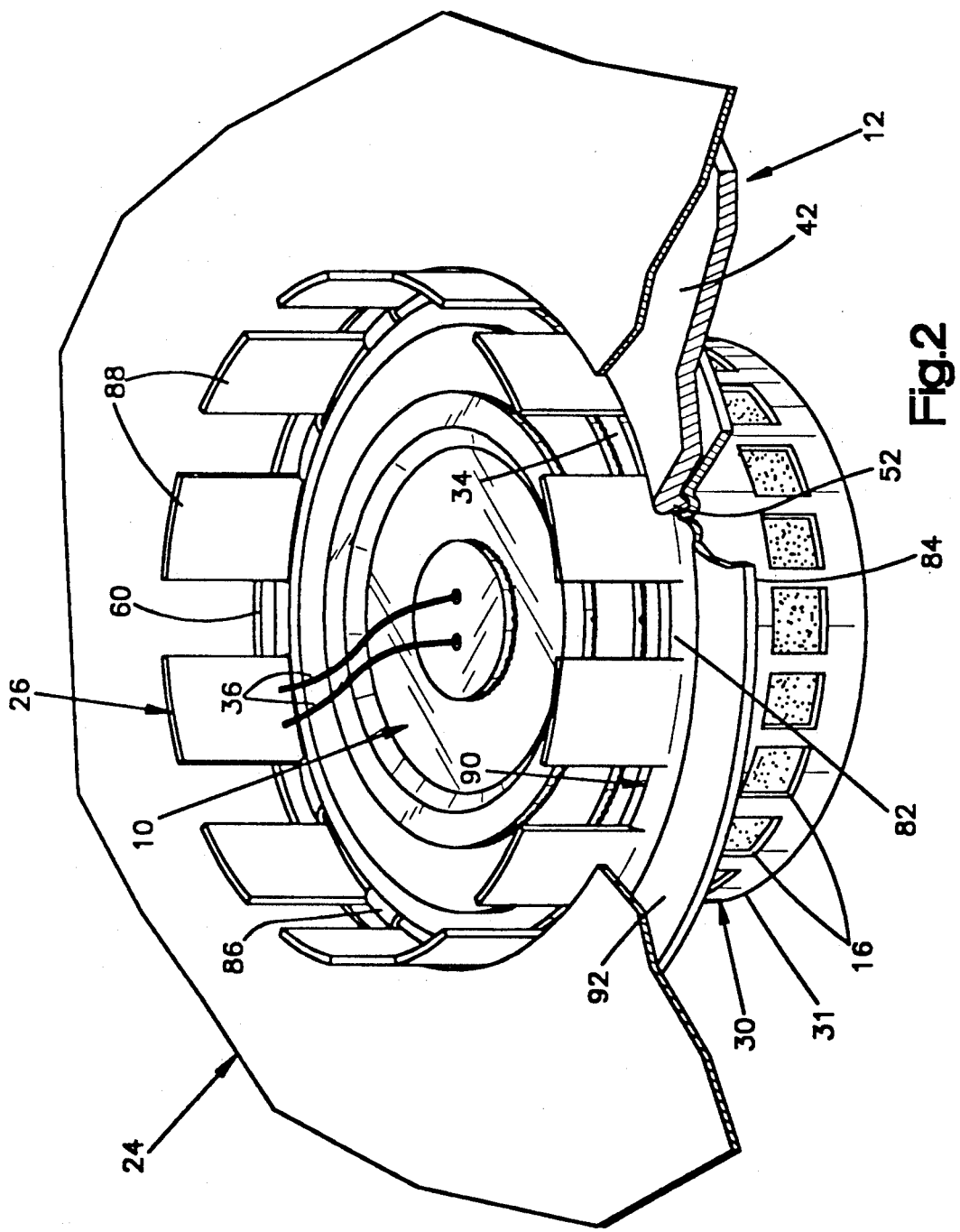
Figure 3:
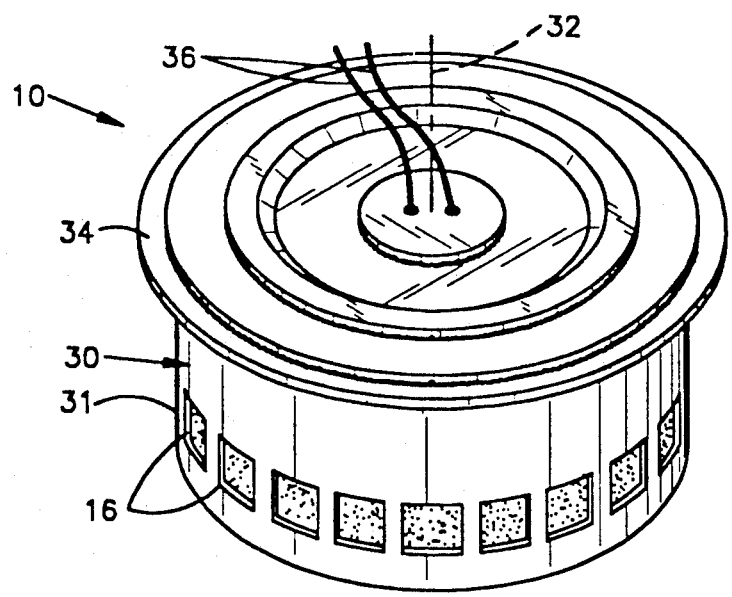
Figure 4:
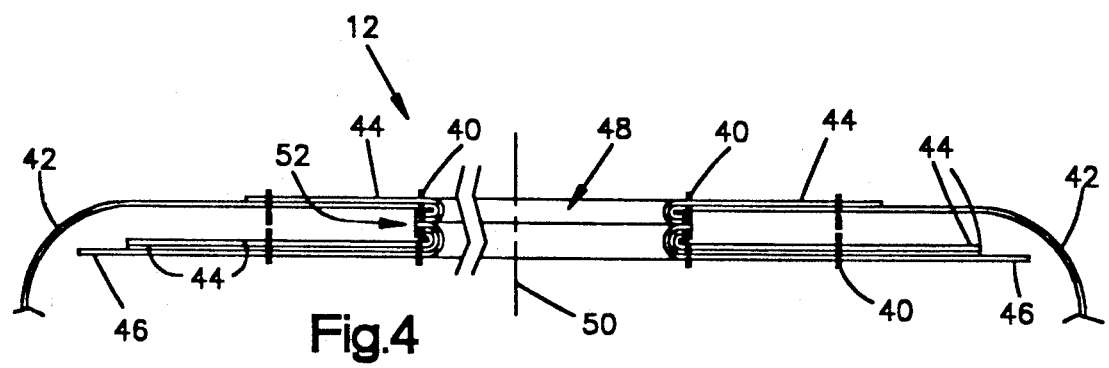
Figure 5:
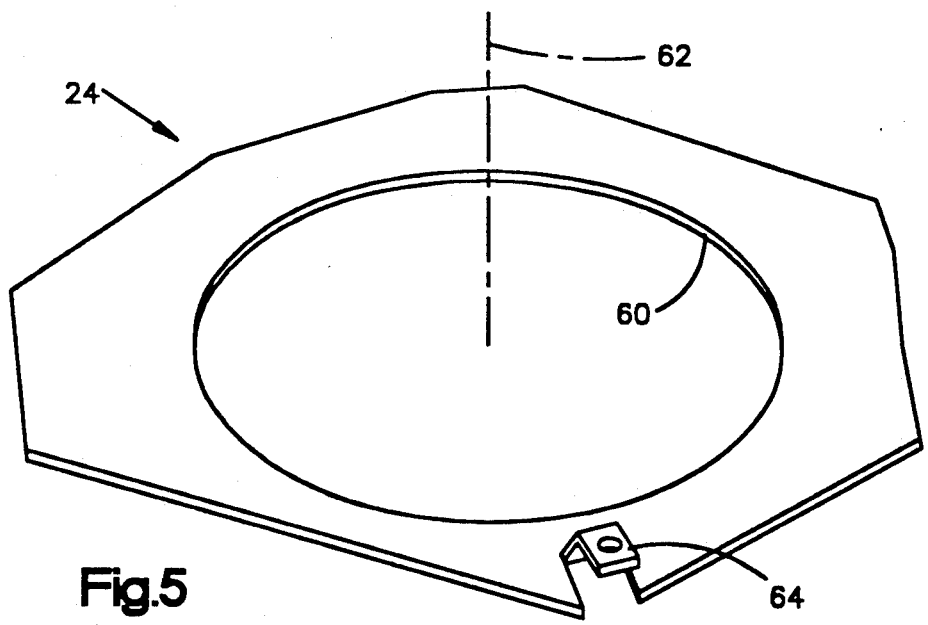

FIG. 2 is a perspective view, partially in section, of parts of the vehicle occupant safety apparatus of FIG. 1 in a partially assembled condition;

FIG. 3 is a perspective view of a part of the safety apparatus of FIG. 1;

FIG. 4 is a schematic fragmentary view of a part of the safety apparatus of FIG. 1;

FIG. 5 is a partial perspective view of a part of the safety apparatus of FIG. 1

Figure 6A:
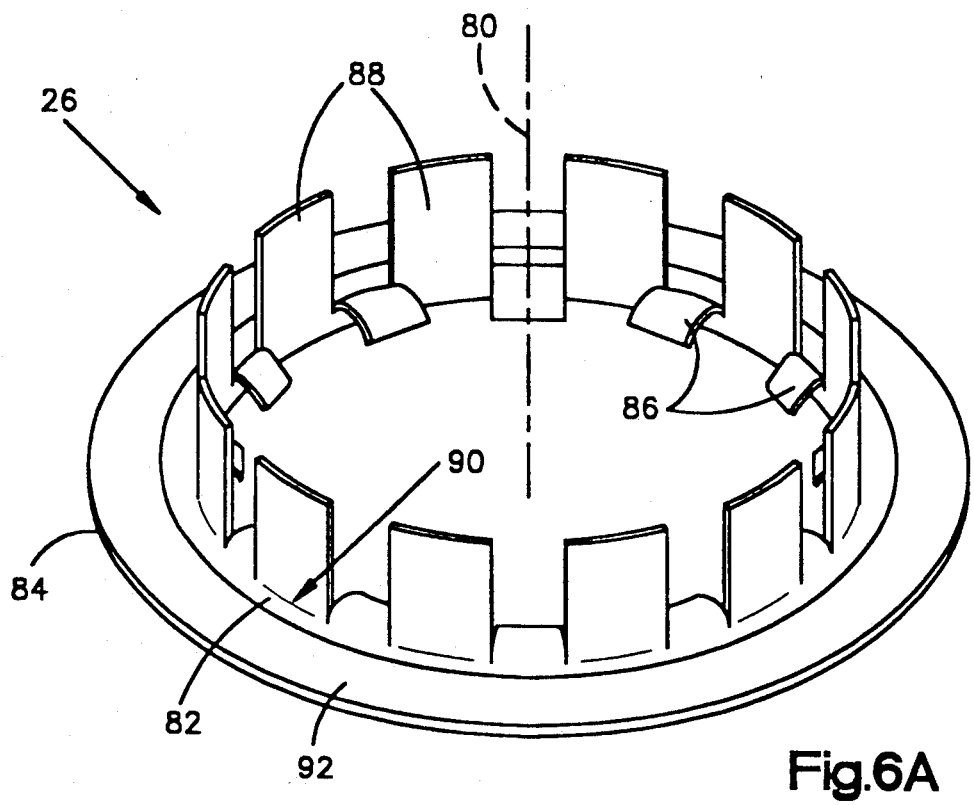
Figure 6B:
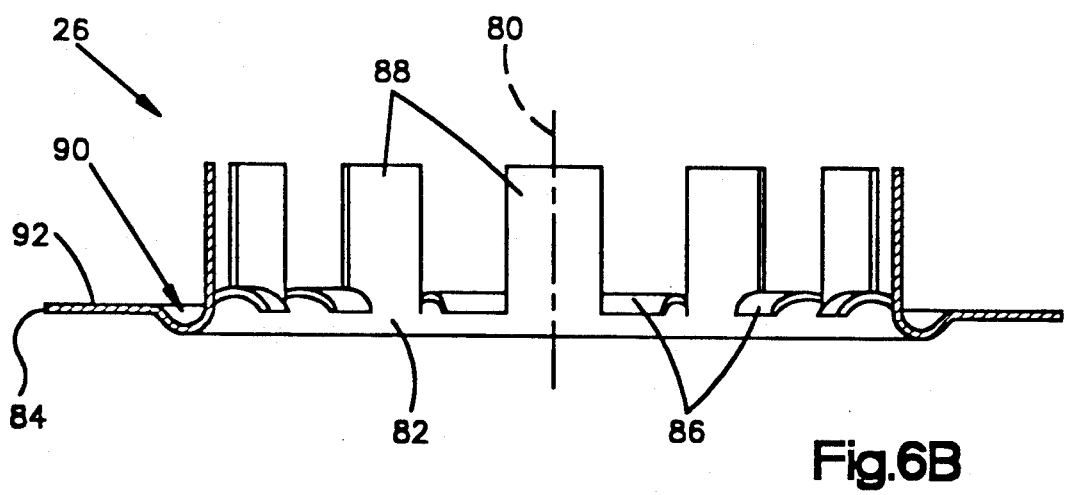

FIG. 6A is a perspective view of a part of the safety apparatus of FIG. 1 prior to assembly of the safety apparatus;

FIG. 6B is a sectional view of the part shown in FIG. 6A; and

Figure 7:
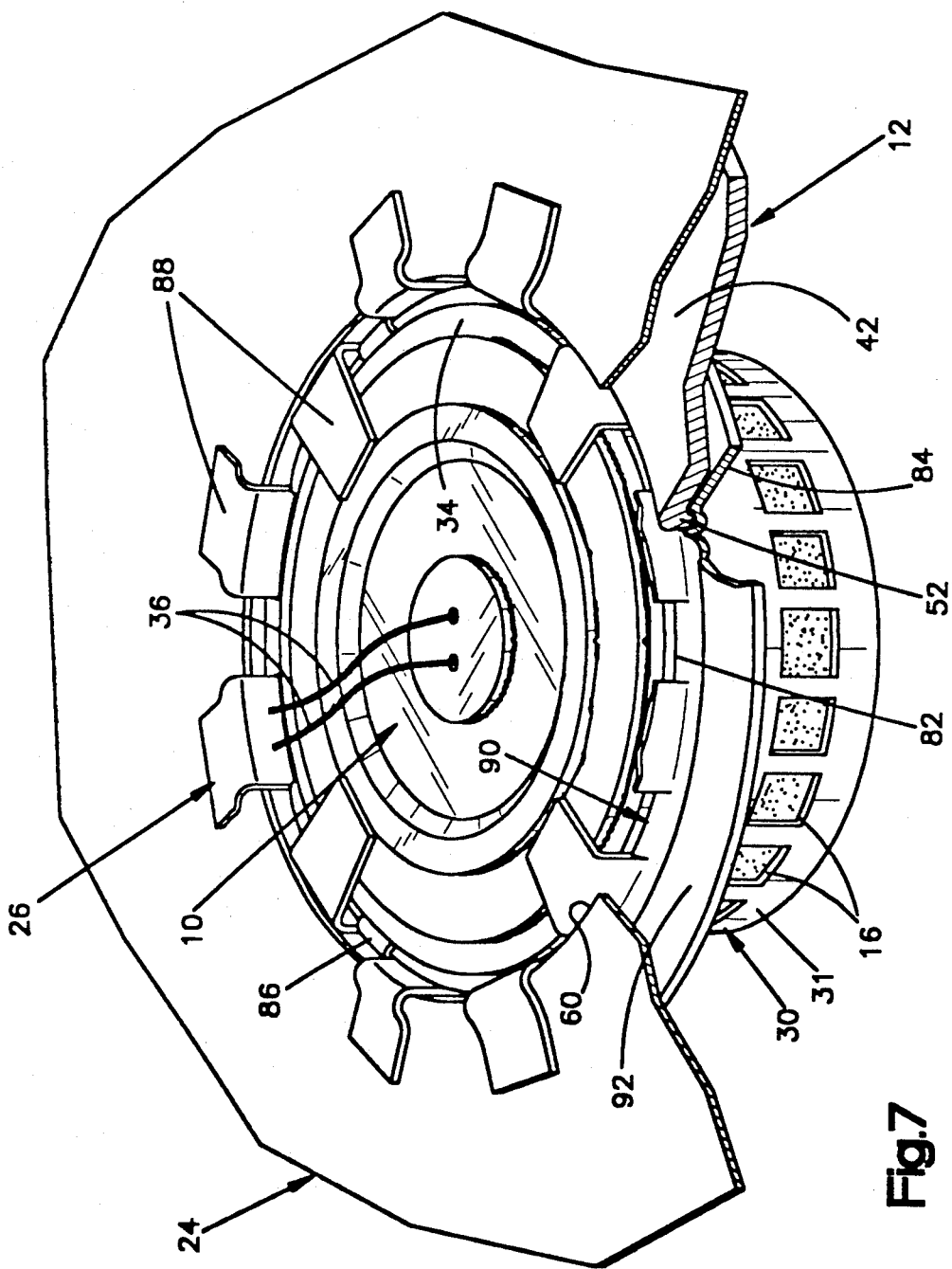

FIG. 7 is a view of the parts shown in FIG. 2 in a more fully assembled condition.

DESCRIPTION OF A PREFERRED EMBODIMENT OF THE INVENTION

As shown in FIG. 1, a vehicle occupant safety apparatus in accordance with the present invention comprises an inflator 10, an inflatable air bag 12, and a cover 14. The inflator 10 has gas outlet openings 16, and contains a gas generating material (not shown). The air bag 12 is received over the inflator 10 in a folded condition as indicated in FIG. 1. The cover 14 has a relatively weak portion 18, and covers the inflator 10 and the air bag 12. The inflator 10, the air bag 12, and the cover 14 are parts of a module 20 which is mounted on a vehicle steering wheel 22.

Upon the occurrence of sudden vehicle deceleration, such as occurs in a collision, the inflator 10 is energized, and the gas generating material contained in the inflator 10 produces a large volume of gas. The gas produced by the gas generating material emerges from the gas outlet openings 16 and expands the air bag 12. As the air bag 12 begins to expand, it breaks the relatively weak portion 18 of the cover 14. As the air bag 12 continues to expand, it moves past the broken cover 14 into the space between the driver of the vehicle and the steering wheel 22 to restrain movement of the driver, as is known.

The module 20 comprising the inflator 10, the air bag 12, the cover 14 and a support plate 24 is assembled separately from the steering wheel 2. FIG. 2 shows the module 20 in a partially assembled condition without the cover 14. For the purpose of illustration, the parts of the module 20 shown in FIG. 2 are overturned relative to the steering wheel 22 as shown in FIG. 1. The parts of the module 20 as shown in FIG. 2 include the inflator 10, the air bag 12, the support plate 24 and a retainer 26.

As shown in FIG. 3, the inflator 10 comprises a cylindrical housing 30. The housing 30 has a main body portion 31 having a central axis 32 and a flange 34 extending radially outwardly from the main body portion 31 in a direction perpendicular to the axis 32. A pair of lead wires 36 extend from the inflator 10. The lead wires 36 transmit an ignition signal to an igniter (not shown) in the inflator 10 to energize the inflator 10, in a known manner, upon the occurrence of sudden vehicle deceleration.

As shown in FIG. 4, the air bag 12 comprises separate panels which are sewn together by stitching 40. The panels include a main panel 42 defining the body of the air bag 12, reinforcing panels 44, and a heat shield panel 46. The panels 42, 44, and 46 are stitched into overlying relationship as shown schematically in FIG. 4. The panels 42, 44, and 46 define both an opening 48 centered on an axis 50 and a doubled-over portion 52 of the air bag 12 extending circumferentially around the opening 48. The opening 48 has a diameter larger than the outer diameter of the flange 34 of the inflator housing 30. The panels 42, 44 and 46 are preferably formed of nylon with a neoprene coating.

As shown partially in FIG. 5, the support plate 24 has a circular edge surface 60 defining an opening centered on an axis 62. The support plate 24 also has tabs 64 (one of which is shown in FIG. 5) for connecting the support plate 24 to the hub of a vehicle steering wheel by bolts in a known manner.

Referring to FIGS. 6A and 6B, the retainer 26 is an annular member having a central axis 80. The retainer 26 comprises a ring-shaped base portion 82, a circular flange 84, and a plurality of tabs, including a first group of tabs 86 and a second group of tabs 88. The annular base portion 82 of the retainer 26 is formed with a circumferentially extending groove 90. The circular flange 84 extends radially outwardly from one edge of the groove 90 in the base portion 82. An annular mounting surface 92 on the flange 84 extends in a plane perpendicular to the axis 80. The outer diameter of the flange 84 is larger than the diameter of the opening defined by the surface 60 of the support plate 24. The outer diameter of the flange 84 is also larger than the diameter of the opening 48 in the air bag 12.

When the retainer 26 is in the shape shown in FIGS. 6A and 6B, the tabs 86 of the first group extend radially inward equal distances from the edge of the groove 90 in the base portion 82 opposite the flange 84. The tabs 86 have arcuate profiles, and also extend equal distances from the base portion 82 in a direction along the axis 80. Each of the tabs 86 of the first group defines a portion of a segmented mounting ledge which is generally perpendicular to the axis 80. The inner diameter of the mounting ledge is smaller than the outer diameter of the flange 34 of the inflator housing 30. The inner diameter of the mounting ledge is also larger than the diameter of the main body portion 31 of the housing 30.

The tabs 88 of the second group are longer than the tabs 86 of the first group, and extend away from the edge of the groove 90 in the base portion 82 opposite the flange 84. The tabs 88 all extend parallel to the axis 80 and in a single direction away from the base portion 82 when the retainer 26 is in the shape shown in FIGS. 6A and 6B. The tabs 88 thus define an opening with a diameter larger than the outer diameter of the flange 34 of the inflator housing. The retainer 26 is preferably a single piece of metal which is formed into the shape shown in FIGS. 6A and 6B by a stamping process.

During assembly of the inflator 10, the air bag 12, the support plate 24, and the retainer 26 are arranged as shown in FIG. 2. Specifically, the inflator 10 is moved axially relative to the retainer 26 into the opening defined by the tabs 88 (i.e., from the top to the bottom of FIG. 2). The inflator 10 is moved axially until the flange 34 on the inflator 10 rests against the segmented mounting ledge defined by the first tabs 86 on the retainer 26. In this position, the central axis 32 of the inflator housing 30 is generally coaxial with the central axis 80 of the retainer 26. The air bag 12 is positioned so that the axis 50 of the opening 48 is generally coaxial with the central axis 80 of the retainer 26. The doubled-over portion 52 of the air bag 12 adjacent to the opening 48 is received in the groove 90 in the retainer 26. The overlying portions of the panels 42, 44, and 46 then extend from the groove 90 radially outwardly over the annular mounting surface 92 on the circular flange 84. The support plate 24 is then moved axially relative to the retainer 26 so that the tabs 88 project through the opening defined by the surface 60 of the support plate 24. In that position, the support plate 24 engages the portion of the air bag 12 that overlies the flange 84 on the retainer 26. The central axis 62 of the opening in the support plate 24 is then generally coaxial with the axes 50, 32 and 80.

When in their relative positions shown in FIG. 2, the inflator 10, the air bag 12, the support plate 24, and the retainer 26 are ready to be clamped together. Several of the second tabs 88 on the retainer 26 are bent into positions extending radially inwardly from the base portion 82 of the retainer 26, as shown in FIG. 7. The inwardly extending second tabs 88 thus clamp the flange 34 on the inflator 10 against the segmented mounting ledge defined by the first tabs 86 on the retainer 26. Preferably, four of the second tabs 88 are bent inwardly of the retainer 26 at locations spaced apart approximately 90 degrees, as shown in FIG. 7.

Those of the second tabs 88 remaining in their axially extending positions are then bent into positions extending radially outwardly as shown in FIG. 7. The radially outward extending tabs 88 thus clamp the support plate 24 and the air bag 12 against the flange 84 on the retainer 26. The doubled over portion 52 of the air bag 12 is anchored in the groove 90 in the retainer 26 to resist movement of the air bag 12 out of its clamped position under the force of the gas inflating the air bag 12. Preferably, the outward extending tabs 88 have arcuate profiles, as shown in FIG. 7, where they are bent to clamp the support plate 24. Such arcuate profiles help to avoid a concentration of stresses which may occur if the tabs 88 have a more acutely angled bend. In addition, the arcuate profiles permit the tabs to be bent in such a way as to prevent spring back of the tabs.

After being clamped together into the positions shown in FIG. 7, the inflator 10, the air bag 12, the support plate 24, and the retainer 26 can be mounted as a unit on the steering wheel 22 with the cover 14 as shown in FIG. 1. As previously described, bolts are inserted through the tabs 64 on the support plate 24 to secure the support plate 24 and the other components of the module 20 to the steering wheel 22.

The present invention has been described with reference to a preferred embodiment. Improvements, changes and modifications may occur to those skilled in the art. Such improvements, changes and modifications are intended to be included within the scope of the appended claims.

Having described the invention, the following is claimed:

1. A vehicle occupant safety apparatus comprising:
an inflatable vehicle occupant restraint;
an inflator for inflating said restraint;
a support plate; and
means for clamping said restraint, said inflator, and said support plate together, said clamping means comprising a retainer member, said retainer member having an axis, a ring-shaped portion centered on said axis, and clamping elements projecting from said ring-shaped portion, said clamping elements being tabs arranged in an array extending circumferentially about said axis, said tabs being bent into clamping positions and including tabs bent radially inward of said ring-shaped portions and tabs bent radially outward of said ring-shaped portion.

2. A vehicle occupant safety apparatus as defined in claim 1, wherein said tabs include tabs of differing lengths.

3. A vehicle occupant safety apparatus as defined in claim 2, wherein said tabs include a first group of tabs bent radially inward of said ring-shaped portion, a second group of tabs bent radially inward of said ring-shaped portion and being longer than said tabs of said first group, and a third group of tabs bent radially outward of said ring-shaped portion and being longer than said tabs of said first group.

4. A vehicle occupant safety apparatus as defined in claim 1, wherein said retainer member having said clamping elements is a single piece of metal.

5. A vehicle occupant safety apparatus comprising:
an inflatable vehicle occupant restraint;
an inflator for inflating said restraint,
a support plate; and
means for clamping said restraint, said inflator, and said support plate together, said clamping means comprising a retainer member, said retainer member having a ring-shaped portion defining an opening, first clamping portions for applying clamping forces to said restraint and said support plate at locations radially outward of said opening, and second clamping portions for applying clamping forces to said inflator at locations radially inward of said opening.

6. A vehicle occupant safety apparatus as defined in claim 5 wherein said retainer member is a single piece of metal, said clamping means consisting of said retainer member.

7. A vehicle occupant safety apparatus comprising:
an inflatable vehicle occupant restraint having a first axis and an opening centered on said first axis;
an inflator for inflating said restraint, said inflator having a second axis;
a support plate having a third axis and an opening centered on said third axis; and
a retainer member having means for applying clamping forces on opposite axial sides of said restraint, said inflator, and said support plate to clamp said restraint, said inflator, and said support plate to said retainer member, said retainer member supporting said inflator in a position radially inward of said openings;
said retainer member having a fourth axis and a ring-shaped portion that is centered on said fourth axis, said retainer member, said restraint, said inflator, and said support plate being coaxial; and
said means for applying clamping forces including an annular flange extending radially from said ring-shaped portion of said retainer member and a plurality of tabs extending from said ring-shaped portion, at least some of said tabs being bent into positions extending radially over said flange.

8. A vehicle occupant safety apparatus comprising:
an inflatable vehicle occupant restraint,
an inflator for inflating said restraint, said inflator having an inflator housing with an axis and a flange extending circumferentially about said axis, said flange having an outer edge;
a support plate; and
a retainer member extending circumferentially around said inflator housing, said retainer member having first means connecting said support plate and said inflatable restraint to the inflator and second means clamping said inflator to said retainer member, said second means including clamping portions of said retainer member located on opposite axial sides of said flange on said inflator, said clamping portions of said retainer member clamping said flange between said clamping portions of said retainer member, said retainer member further extending around said outer edge of said flange between said clamping portions and joining said clamping portions to each other.

9. An apparatus as defined in claim 8 wherein said clamping portions of said retainer member include bendable tabs extending from said base portion.

* * * * *

UNITED STATES PATENT AND TRADEMARK OFFICE
CERTIFICATE OF CORRECTION

PATENT NO. : 5,141,247
DATED : August 25, 1992
INVENTOR(S) : Thomas H. Barth

It is certified that error appears in the above-identified patent and that said Letters Patent is hereby corrected as shown below:

Column 4, Line 66, Claim 1, change "portions" to --portion--.

Signed and Sealed this

Fifth Day of October, 1993

Attest:

BRUCE LEHMAN

Attesting Officer          Commissioner of Patents and Trademarks